(12) United States Patent
West et al.

(10) Patent No.: US 9,482,352 B2
(45) Date of Patent: Nov. 1, 2016

(54) FLOW DIRECTING SPOOL FOR VALVE

(71) Applicant: Eaton Corporation, Cleveland, OH (US)

(72) Inventors: Gary West, Havant (GB); Javedkhan Nijam Tamboli, Pune (IN); Aniruddha Kulkarni, Pune (IN)

(73) Assignee: EATON CORPORATION, Cleveland, OH (US)

( * ) Notice: Subject to any disclaimer, the term of this patent is extended or adjusted under 35 U.S.C. 154(b) by 232 days.

(21) Appl. No.: 13/714,799

(22) Filed: Dec. 14, 2012

(65) Prior Publication Data

US 2013/0153068 A1 Jun. 20, 2013

Related U.S. Application Data

(60) Provisional application No. 61/576,069, filed on Dec. 15, 2011.

(51) Int. Cl.
*F16K 11/044* (2006.01)
*F16K 11/07* (2006.01)
*F15B 13/04* (2006.01)

(52) U.S. Cl.
CPC ....... *F16K 11/0712* (2013.01); *F15B 13/0402* (2013.01); *F16K 11/0708* (2013.01); *Y10T 137/8671* (2015.04)

(58) Field of Classification Search
CPC ............ F16K 11/0712; F16K 11/0708; F15B 13/0402; Y10T 137/8671
USPC .......................................... 137/25–27, 67–69
See application file for complete search history.

(56) References Cited

U.S. PATENT DOCUMENTS

| | | | | |
|---|---|---|---|---|
| 2,485,504 A | * | 10/1949 | Morgan | 251/324 |
| 2,969,045 A | | 1/1961 | Milton | |
| 3,072,149 A | * | 1/1963 | Hasbany | 137/625.69 |
| 3,198,212 A | * | 8/1965 | Junck et al. | 137/625.37 |
| 3,589,401 A | * | 6/1971 | Harding | 137/625.67 |
| 3,735,780 A | * | 5/1973 | Heid | 137/625.69 |
| 3,812,883 A | * | 5/1974 | Yokokawa | 137/625.69 |
| 3,990,477 A | * | 11/1976 | Johnson | 137/625.69 |
| 4,220,178 A | * | 9/1980 | Jackson | 137/625.3 |
| 4,232,584 A | * | 11/1980 | Fassbender | 91/418 |

(Continued)

FOREIGN PATENT DOCUMENTS

| | | |
|---|---|---|
| DE | 19820563 A1 | 1/1999 |
| EP | 1801473 A2 | 6/2007 |

OTHER PUBLICATIONS

PCT International Search Report and Written Opinion in Application PCT/US2012/069762, mailed Jun. 21, 2013, 12 pages.

(Continued)

*Primary Examiner* — Marina Tietjen
*Assistant Examiner* — Umashankar Venkatesan (57) ABSTRACT

A spool valve includes a body defining a bore and a positionable spool located within the bore. The spool includes a central body portion having a diameter and a number of sealing lands separated by the central body portion. Each sealing land has a diameter larger than the central body portion diameter. A plurality of flow-shaping rings are located between first and second sealing lands, and each comprise an intermediate diameter larger than the central body portion diameter and smaller than the sealing land diameter.

29 Claims, 5 Drawing Sheets

(56) References Cited

U.S. PATENT DOCUMENTS

| | | | | |
|---|---|---|---|---|
| 4,408,722 A | * | 10/1983 | Frelund | 239/453 |
| 4,651,776 A | * | 3/1987 | Nakano et al. | 137/625.69 |
| 4,941,508 A | * | 7/1990 | Hennessy et al. | 137/625.69 |
| 5,103,866 A | | 4/1992 | Foster | |
| 5,944,042 A | * | 8/1999 | Takahashi et al. | 137/1 |
| 6,776,191 B2 | * | 8/2004 | Nakamura et al. | 137/625.69 |
| 7,757,713 B2 | * | 7/2010 | Lohrberg et al. | 137/625.27 |
| 7,921,879 B2 | * | 4/2011 | Eschweiler | 137/625.68 |
| 2008/0202608 A1 | * | 8/2008 | Tschida et al. | 137/554 |
| 2009/0007976 A1 | * | 1/2009 | Desbois-Renaudin | 137/624.27 |

OTHER PUBLICATIONS

PCT International Search Report and Written Opinion in International Application PCT/US2012/069762, mailed Jun. 21, 2013, 12 pgs.

Pilot Operated Directional Valves Catalog, Eaton, Vickers, Mar. 2007, 38 pgs.

* cited by examiner

FLOW DIRECTING SPOOL FOR VALVE

CROSS-REFERENCE TO RELATED APPLICATIONS

This application claims priority to and the benefit of U.S. Provisional Patent Application Ser. No. 61/576,069, filed Dec. 15, 2011, entitled "Flow Directing Spool for Valve," the disclosure of which is hereby incorporated by reference herein in its entirety.

INTRODUCTION

Hydraulic spool valves are commonly used to control fluid communication between a pump and a hydraulic actuator (e.g., a hydraulic piston, a hydraulic motor, etc.). A spool valve includes a spool located within a bore defined by a valve body (i.e., a sleeve). The valve body can include a number of fluid ports that are fluidly connected to the bore. The fluid ports can include a pump port, a tank port and first and second work-ports. The spool is axially movable within the bore between first and second positions. In the first position, the pump port is placed in fluid communication with the first work port and the second work port is placed in fluid communication with the tank port. In the second position, the pump port is placed in fluid communication with the second work port and the first work port is placed in fluid communication with the tank port. The spool can also be moved to a neutral position. In "open center" spool valves, fluid communication is open between the pump port, the tank port and the first and second work ports when the spool is in neutral position. In "closed center" spool valves, fluid communication is closed between the pump port, the tank port and the first and second work ports when the spool is in the neutral position.

Spool valves control the flow paths described above by utilizing a number of lands on the spool. The lands, often called sealing lands, seal various galleries within the bore, depending on the position of the spool. The galleries are annular open spaces positioned along the bore having projections or walls located therebetween. Sealing lands seal against these walls, thereby dictating the path that fluid forced into the bore must take.

In spool valves, pressure drops can occur as fluid flows through the valves. Designs for improving valve performance by reducing pressure drops are desirable.

SUMMARY

In one aspect, the technology relates to a valve having: a valve body defining a bore having a central axis, the valve body also defining a gallery including an annular cavity that surrounds the central axis and includes an open inner side in fluid communication with the bore, the gallery having an axial width; and a spool mounted within the bore, the spool being movable within the bore along the central axis, the spool including an annular sealing land that projects radially outwardly from a main body of the spool, the spool including a flow-shaping ring that projects radially outwardly from the main body of the spool, the flow-shaping ring having an outer diameter that is smaller than an outer diameter of the annular sealing land, the flow-shaping ring being separated from the annular sealing land by an annular flow-shaping groove, the annular flow-shaping groove having an axial width that is smaller than the axial width of the gallery, wherein the flow-shaping ring and the flow-shaping groove are axially co-extensive with the gallery when the gallery is fully open.

In another aspect, the technology relates to a spool valve having: a body defining a bore; and a positionable spool located within the bore, wherein the spool includes: a central body portion including a central body portion diameter; sealing lands each including a sealing land diameter larger than the central body portion diameter, the sealing lands including first and second sealing lands that are separated by the central body portion; and a plurality of flow-shaping rings located between the first and second sealing lands, wherein the flow-shaping rings each include an intermediate diameter larger than the central body portion diameter and smaller than the sealing land diameter.

In another aspect, the technology relates to a valve having: a valve body defining a bore having a central axis, the valve body also defining a plurality of galleries that are axially spaced-apart from one another along the central axis, the galleries including a pump gallery positioned between a first work-port gallery and a second work-port gallery, each of the galleries including an annular cavity that surrounds the central axis and includes an open inner side in fluid communication with the bore, the valve body defining a first work port fluidly connected to the first work-port gallery, a second work port fluidly connected to the second work-port gallery, and a pump port fluidly connected to the pump gallery, the pump gallery defining an axial width; and a spool mounted within the bore, the spool being movable within the bore along the central axis, the spool including first and second annular sealing lands that project radially outwardly from a main body of the spool, the first and second annular sealing lands being separated from one another by an annular flow passage that extends along the central axis between the valve body and the main body of the spool, the spool including first and second flow-shaping rings that project radially outwardly from the main body of the spool, the first and second flow-shaping rings being positioned within the flow passage, the first and second flow-shaping rings having outer diameters that are smaller than outer diameters of the first and second annular sealing lands, the first flow-shaping ring being separated from the first annular sealing land by a first annular flow-shaping groove, the second flow-shaping ring being separated from the second annular sealing land by a second annular flow-shaping groove, the first and second annular flow-shaping grooves having axial widths that are smaller than the axial width of the pump gallery; the spool being axially movable within the bore between a first position and a second position, wherein in the first position: a) the annular flow passage provides fluid communication between the pump gallery and the second work-port gallery; b) the first annular sealing land blocks fluid communication between the pump gallery and the first work-port gallery; and c) the first flow-shaping ring and the first flow-shaping groove are axially co-extensive with the pump gallery; and wherein in the second position: a) the annular flow passage provides fluid communication between pump gallery and the first work-port gallery; b) the second annular sealing land blocks fluid communication between the pump gallery and the second work-port gallery; and c) the second flow-shaping ring and the second flow-shaping groove are axially co-extensive with the pump gallery.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The technology described below has application in systems that utilize hydraulic actuators such as hydraulic cylinders, other types of cylinder-based mechanical fluid-moving devices, and hydraulic motors. Such actuators are commonly used in industrial equipment and construction equipment (e.g., booms, lifts, swing arms, pivot mechanisms). For clarity, however, the following embodiments will be described in the context of hydraulic cylinders.

The spool valve 100 includes a body or sleeve 102 defining a bore 104. A spool 106 is located within the bore 104 and may be accessed for removal or service by removing one or more end caps 108 secured to the end(s) of the body 102. Coil springs are located in each end 104a of the bore 104 for biasing the spool 106 into a center or neutral position. The bore 104 is surrounded by a number of galleries 110 that define flow paths for hydraulic fluid, depending on the position of the spool 106. The shape of each gallery 110 is that of an annular cavity that is open on its inner side to the bore 104. Each gallery 110 is separated by a wall 110a and is connected to a port 110b, which connects to a particular hydraulic system component via a dedicated hydraulic fluid line, as described below. The outer-most galleries 110 are connected to one or more hydraulic fluid reservoirs or tanks T. These outer-most galleries 110 may be referred to as first and second tank galleries and are connected by a pressure equalizing channel or flow passage 104b. The central pump gallery 110 connects to a pump P outlet for delivery of hydraulic fluid to the bore 104. The other galleries are first and second work galleries connected to each side A, B of a hydraulic cylinder C, via work ports 110b. Although the port configuration depicted herein is very common, the flow direction spool described herein may be used in spool valves having different number and/or configurations of ports, as required or desired, for a particular application. Additionally, the technology may be used in both closed-center and open-center spools.

The spool 106 includes a number of annular lands that project radially outward from the spool 106 and seal galleries 110 during operation of the valve 100. A central body portion 112 of the spool 106 defines a central body portion diameter and directs fluid flow from the pump P to either of ports 110b serving sides A or B of the cylinder C. An annular flow-shaping ring 114 is located at each end of the central body portion 112. The flow-shaping rings 114 define intermediate diameters that are larger than the central body portion diameter. Each flow-shaping ring 114 comprises a first side that faces axially towards a flow-shaping groove 116 and a second side that faces axially away from the groove 116. Outside each flow-shaping ring 114 is the annular flow-shaping gap or groove 116, generally having a groove diameter substantially equal to the central body portion diameter. Other groove diameters may also be used. A sealing land 118 is located outside of each groove 116 and comprises a sealing land diameter. The two sealing lands 118 define an axial flow passage therebetween. Peripheral body portions 120 are located outside each sealing land 118 and comprise a peripheral body portion diameter. Outer sealing lands 122 are located outside the peripheral body portions 120 and form a surface against which the springs may bias the spool 106 into a center position.

Figure 1A:
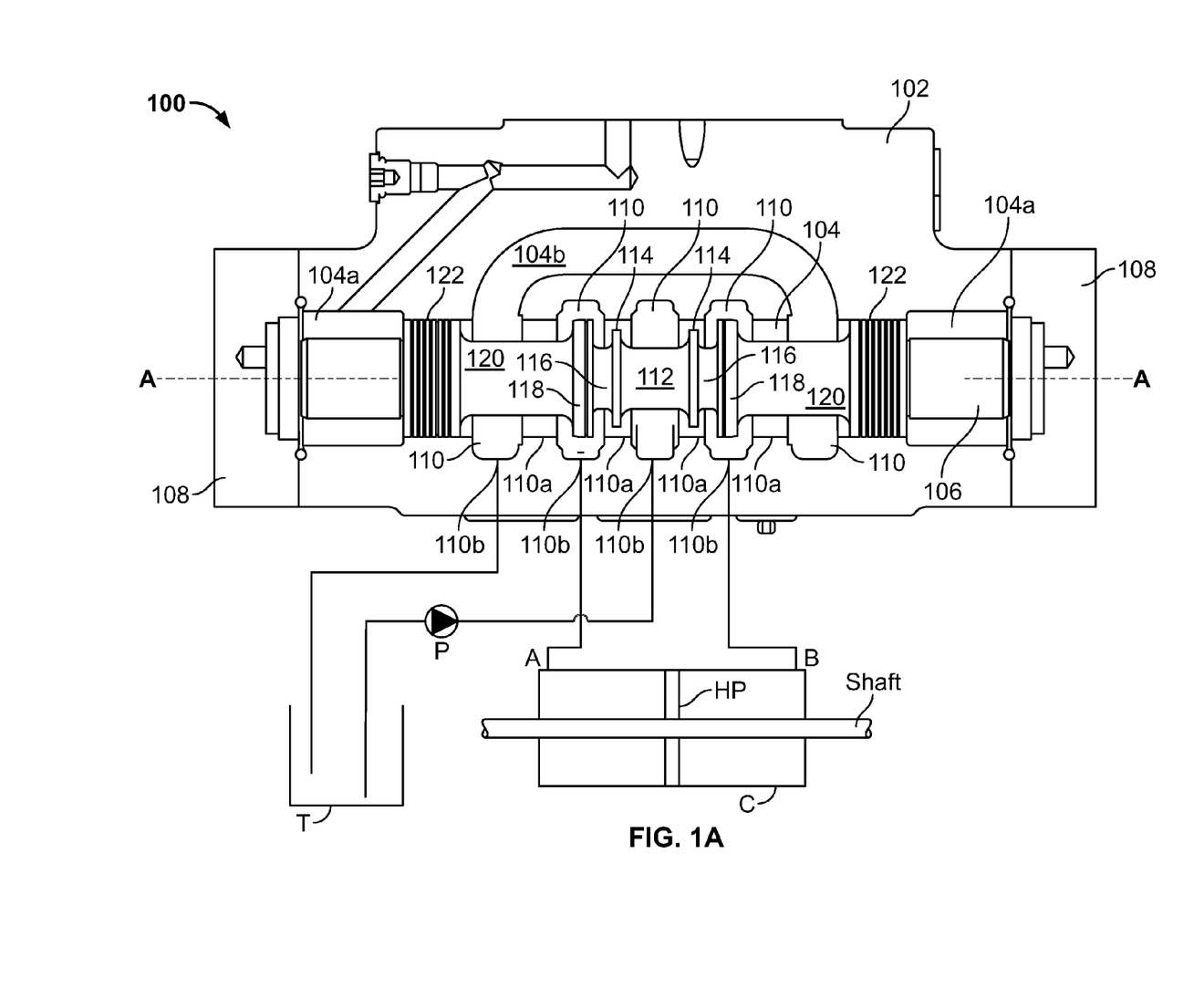
FIG. 1A is a side sectional view of a spool valve in a neutral or center position.
Figure 1B:
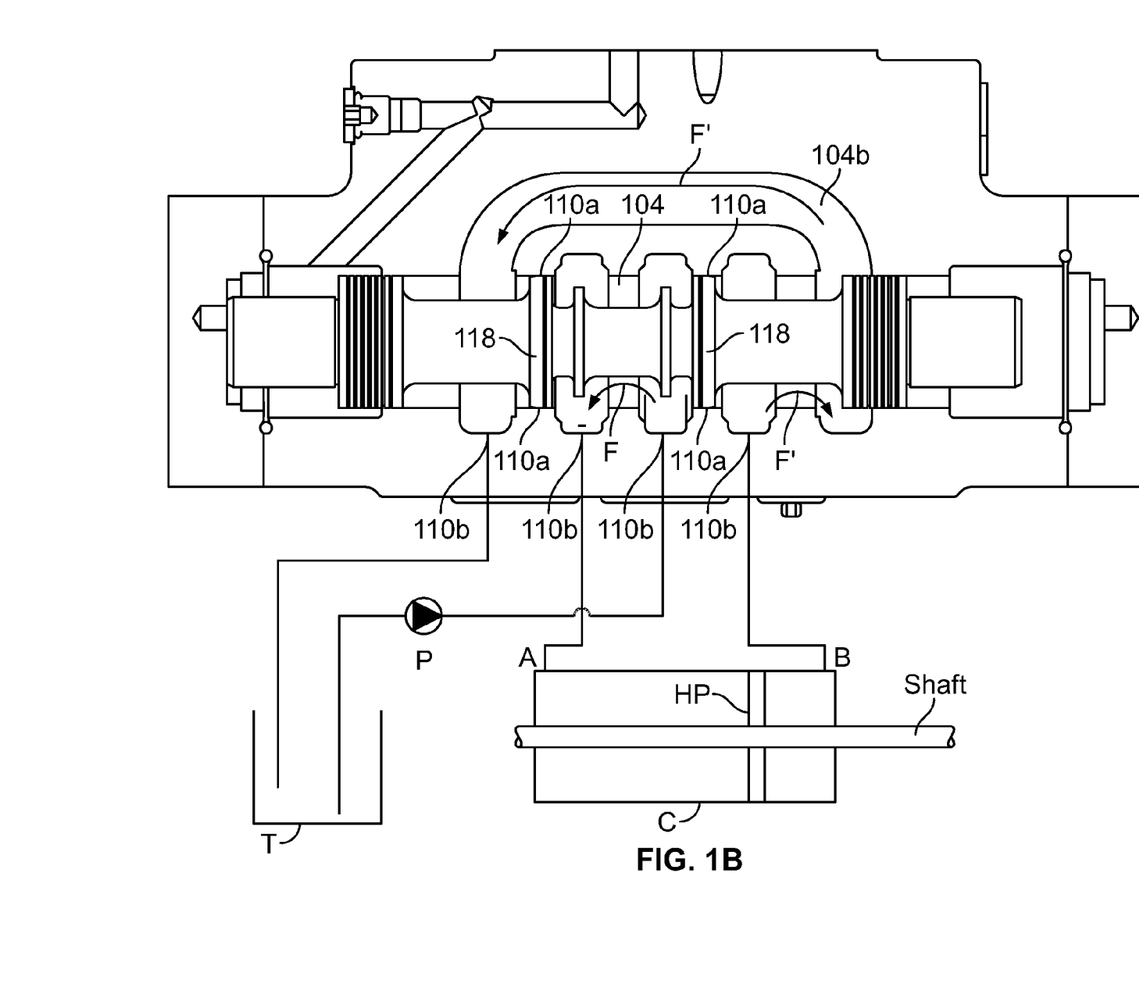
FIG. 1B is a side sectional view of the spool valve of FIG. 1A in a first position.

In FIG. 1A, flow from the pump P passes via a port 110b though the bore 104 and into the tank T. In this center or neutral position, fluid does not exert a force on an associated hydraulic piston HP, as no fluid may flow into or out of cylinder ports 110b connected to sides A and B of the cylinder C. The spool 106 is, however, positionable along an axis A-A, either via electronic or manual controls. In FIG. 1B, the spool 106 is moved to the left in the figure into a first position. The sealing lands 118 are in a sealing relationship with the walls 110a, as depicted. Fluid flow F from the pump P is now forced to pass through a volume of the bore 104 defined by the sealing elements 118 and out the work port 110b to side A of the cylinder C. This drives the piston HP in one direction, and hydraulic fluid on the opposite side B of the piston HP is forced into the bore 104 via the other work port 110b. This fluid flow F' passes through the bore 104 (and the tank passage 104b) to drain into the tank T.

Figure 1C:
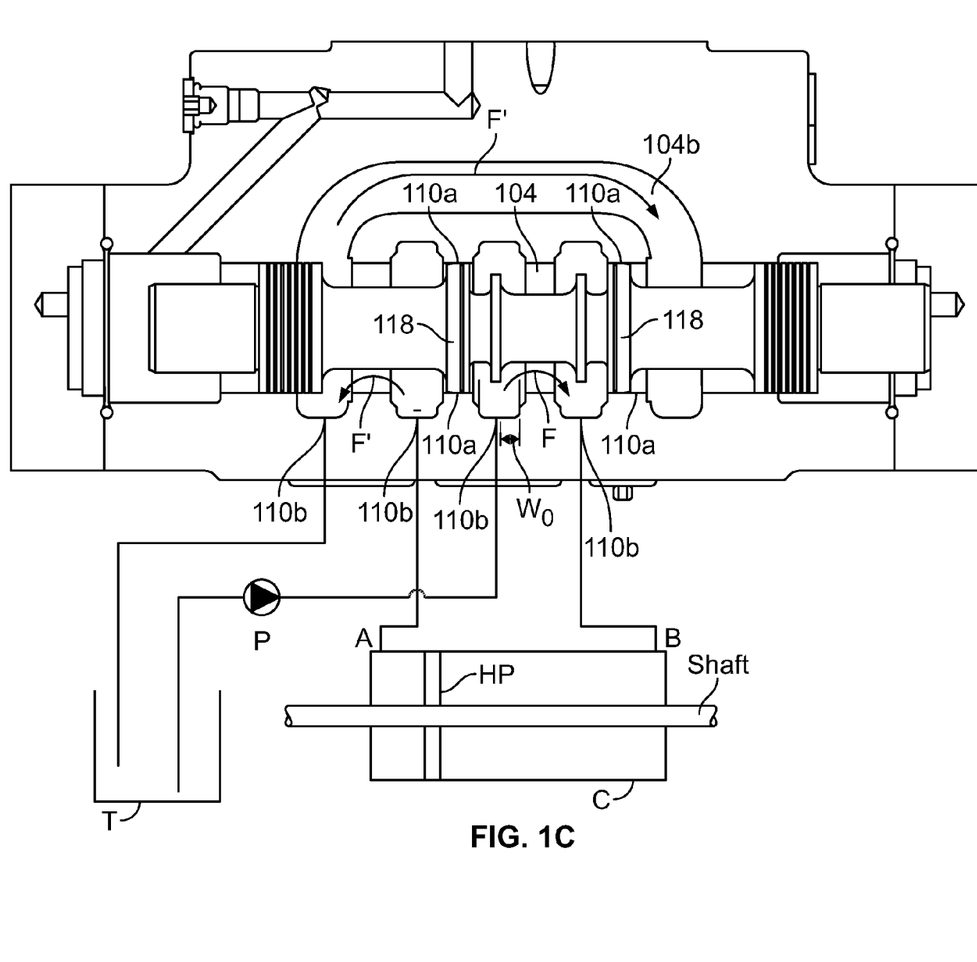
FIG. 1C is a side sectional view of the spool valve of FIG. 1A in a second position.

Similarly, in FIG. 1C, the spool 106 is moved to the right in the figure into a second position. The sealing lands 118 are in a sealing relationship with the walls 110a, as depicted. Fluid flow F from the pump P is now forced to pass through a volume of the bore 104 defined by the sealing elements 118 and out the work port 110b to the second side B of the cylinder C. This drives the piston HP in the second direction, and hydraulic fluid on the first side A of the piston HP is forced into the bore 104 via the first work port 110b. This fluid flow F' passes through the bore 104 (and the tank passage 104b) to drain into the tank T. In the first and second positions depicted in FIGS. 1B and 1C, one each of the flow-shaping grooves 116 and flow-shaping rings 114 axially overlap the central pump gallery 110, or are at least in partial axial alignment with that central pump gallery 110. In that regard, the particular flow-shaping groove 116 and the flow-shaping ring 114 may be referred to as axially co-extensive with the pump gallery 110.

It has been determined that the diameters of the various portions of the spool, as well as other dimensions, effect the pressure drop of the hydraulic fluid through the spool valve 100. Although many embodiments of the spool are contemplated, those having certain dimensional relationships have displayed highly desirable performance. A number of dimensions are identified in FIG. 2. In general, the central body portion diameter $\varnothing_C$ is the smallest diameter on the spool 106 and is typically equal to the groove diameter $\varnothing_G$. The sealing land diameter $\varnothing_S$ is the largest diameter on the spool 106, and is typically substantially equal to the wall diameter $\varnothing_W$ formed by each wall 110a. More accurately, the difference in the sealing land diameter $\varnothing_S$ and the wall diameter $\varnothing_W$ is minimal, such that the sealing land 118 may pass through the restriction formed by the wall 110a without interference. The limited tolerance between the sealing land 118 and the wall 110a forms a sealing element when those two components are aligned, thus dictating the flow of fluid through the bore 104. In certain embodiments, the central body portion diameter $\varnothing_C$ is about 50% of the sealing land diameter $\varnothing_S$, and the intermediate diameter $\varnothing_I$ is about 80% of the sealing land diameter $\varnothing_S$. Other dimensions are also contemplated. For example, the central body portion diameter $\varnothing_C$ may be about 40% to about 60% of the sealing land diameter $\varnothing_S$, or may be a maximum of 60% of the sealing land diameter $\varnothing_S$. Of course, since the groove diameter may be substantially equal to the central body portion diameter $\varnothing_C$, these dimensions may also apply to the groove diameter. Additionally, the intermediate diameter $\varnothing_I$ may be about 70% to about 90% of the sealing land diameter $\varnothing_S$, or may be a maximum of 90% of the sealing land diameter $\varnothing_S$.

Figure 2:
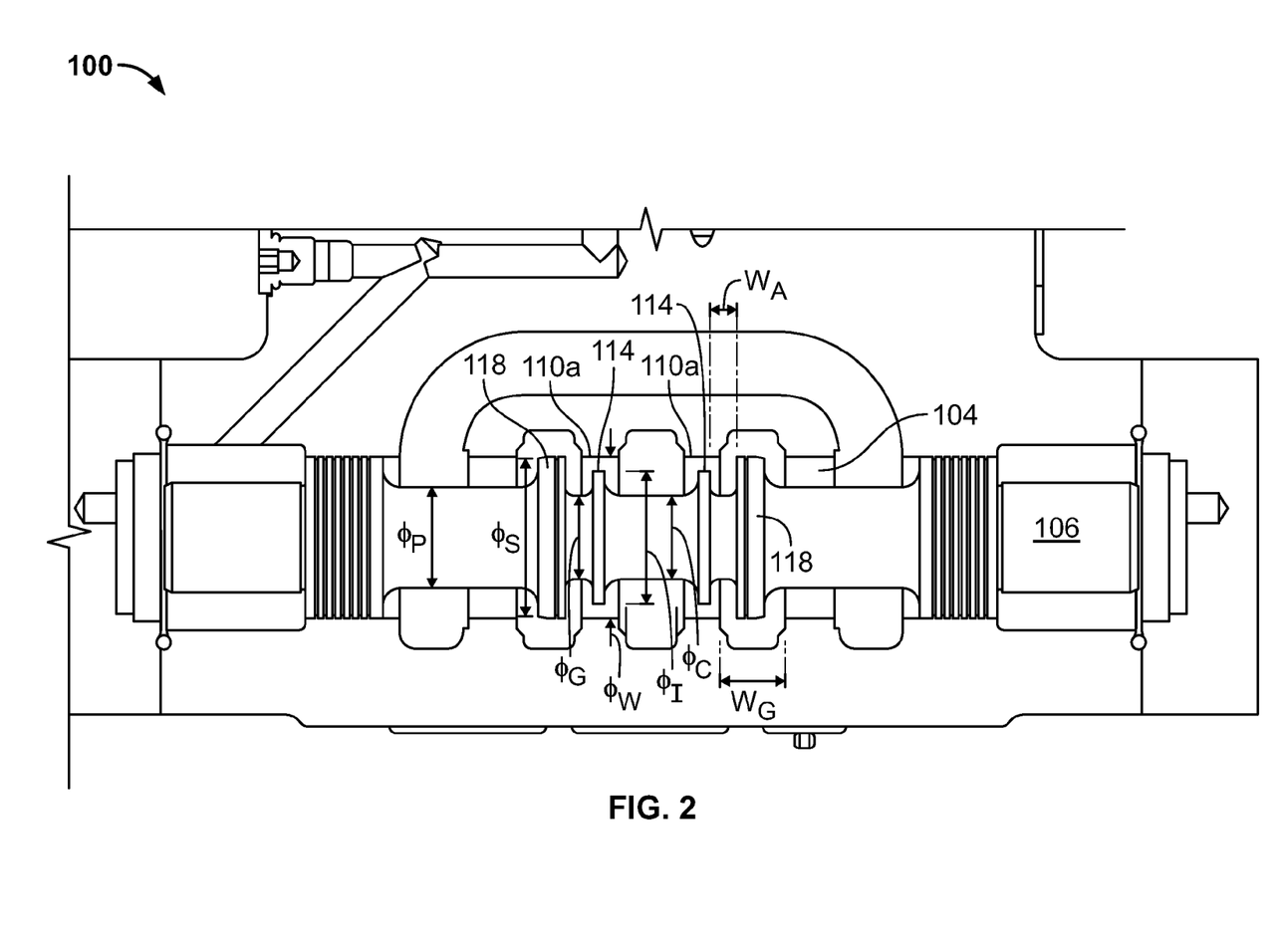
FIG. 2 is an enlarged sectional view of the spool valve of FIG. 1A.

The peripheral portion diameter $\varnothing_P$ is generally larger than the central body portion diameter $\varnothing_C$, but is smaller than the sealing land diameter $\varnothing_S$. The peripheral portion diameter $\varnothing_P$ may or may not be smaller than the intermediate diameter $\varnothing_I$. Spools manufactured with the flow-shaping rings 114, as well as the dimensional relationships described, have displayed increased performance over spools not so constructed. Utilization of the flow-shaping rings 114 does not appear to alter the land timings or change the flow entry angle. Flow-shaping rings 114 do appear to gradually change the flow area, resulting in a decreased pressure drop across the valve. Use of the groove 116 helps eliminate short-circuiting and directs the fluid around the periphery and along the axis of the spool 106, thus helping to completely fill the bore 104 with fluid.

In addition to the relationship between the various diameters, other dimensions have been determined to be helpful to controlling pressure drop through the valve 100. For example, each gallery 110 defines a gallery axial width $W_G$. It has been determined that an axial width $W_A$ of each groove 116 of greater than about 20% of the gallery width $W_G$ may be particularly advantageous. Other dimensions are also contemplated. Such dimensions include an axial width $W_A$ of each groove of less than 25% of the gallery width $W_G$, as well as an axial width $W_A$ of each groove that is 20% to 50% of the gallery width $W_G$. Additionally, the position of the flow-shaping ring 114 relative to a centrally-located wall 110a is also relevant. The position of the spool 106 defines an opening between the flow-shaping ring 114 and the centrally-located wall 110a. Openings having a width $W_O$ (depicted in FIG. 1C) of about 50% of the gallery width $W_G$ have been found to show improved performance. This width $W_O$ is measured from the second side of the flow-shaping ring 114 to the closest wall 110a and defines an axial flow gap with respect to the gallery 110 that may also be in the range of 40% to 60% of the gallery width $W_G$.

Figure 3:
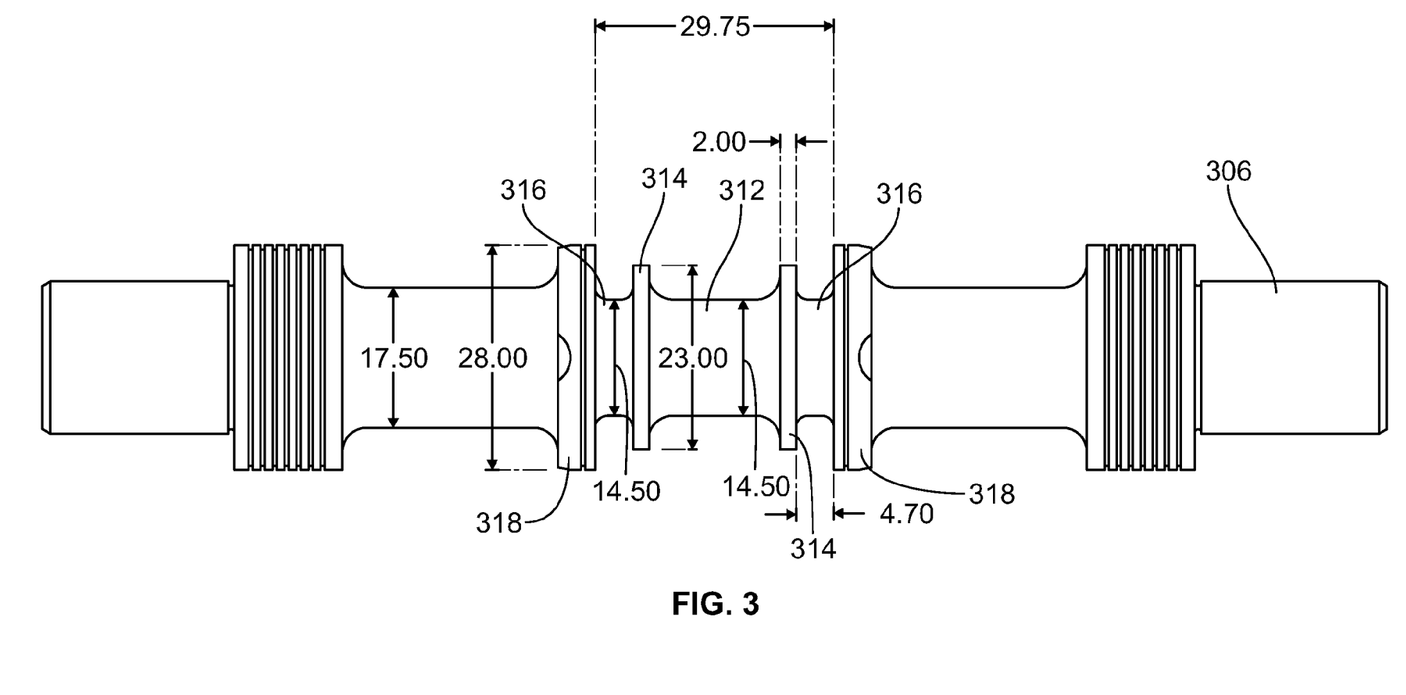
FIG. 3 is a dimensioned drawing of an exemplary spool.

One embodiment of the spool 306, having the flow-shaping rings 314, central body portion 312, grooves 316, and sealing lands 318, such as those described above, is depicted in FIG. 3. Performance of this spool 306 was compared to performance of the current spool used spool valve model no. DGSV-7, manufactured by Eaton Corp. of Cleveland, Ohio. The spool in this valve DGSV-7 has three portions (one central and two outer) having equal diameters, and two sealing lands on either side of the central portion. Pressure drop across the valve at 300 liters/minute was measured and recorded at various spool positions across the ports as indicated in FIGS. 1A-1C. After testing, the original spool was removed and replaced with a spool dimensioned as indicated in FIG. 3. Pressure drop tests were also performed on the valve using the depicted spool 306. The results from both tests are indicated in Table 1 below. As can be seen the improvements in pressure drop are significant with the flow directing spool 306.

The test results depict the shortcomings associated with prior art spool valves. The flow of fluid around the spool and through the various galleries of prior art spool valves creates vortices, dead spaces, and other undesirable conditions that result in significant pressure drops. Typically, the flow within the bore is not streamlined and the whole available flow volume is not used. Additionally, excessive turbulence prevailing in the entry side and the exit side of spool and bore gap causes additional pressure drop. Particularly in open center spool valves, the flow direction is perpendicular to the spool at the galleries, which causes significant pressure drop in the valve as the flow perpendicularly impinges on the spool before flowing in an axial direction. Aspects of the present disclosure relate to structures for reducing pressure drop within spool valves by better transitioning flow so that on average the flow is more parallel to the axis of the spool valve. The improved performance is confirmed by the reduced pressure drops indicated in Table 1, below.

TABLE 1

Pressure drop across DG5V-7 valve ports at 300 lpm flow.

| | Pressure drop (bar) | |
|---|---|---|
| Flow path | Spool 306 | Existing Spool |
| P-A | 4.25 | 6.75 |
| P-B | 4.25 | 6.75 |

The results depicted in Table 1 indicate that use of the spool 306 results in an improvement of about 37% over the existing spool. It has been determined that similar improvements in performance are attained with spools utilizing the technologies described herein, regardless of valve size. Performance improvements in valves of other sizes are in the range of about 35% to about 45%, or about 40%.

The materials used for the spools described herein may be the same as those typically used for hydraulic valves or other similar applications. These include metals such as steel, stainless steel, titanium, bronze, cast iron, and platinum, as well as robust plastics or fiber-reinforced plastics.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:
1. A valve comprising:
 a valve body defining a bore having a central axis, the valve body also defining a gallery including an annular cavity that surrounds the central axis and includes an open inner side in fluid communication with the bore, the gallery having an axial width; and
 a spool mounted within the bore, the spool being movable within the bore along the central axis, the spool including a first annular sealing land and a second annular sealing land that each project radially outwardly from a main body of the spool, the spool including a flow-shaping ring disposed between the first annular sealing land and the second annular sealing land that projects radially outwardly from the main body of the spool, the flow-shaping ring having an outer diameter that is smaller than an outer diameter of the first annular sealing land and the second annular sealing land, the flow-shaping ring being separated from the first annular sealing land by an annular flow-shaping groove, the annular flow-shaping groove having an axial width that is smaller than the axial width of the gallery, wherein the flow-shaping ring and the flow-shaping groove are axially co-extensive with the gallery when the gallery is fully open, and wherein the flow-shaping groove has a diameter substantially equal to a diameter of the main body of the spool.

2. The valve of claim 1, wherein the outer diameter of the flow-shaping ring is at most 90 percent of the outer diameter of the annular sealing land.

3. The valve of claim 1, wherein the annular flow-shaping groove defines an outer diameter that is at most 60 percent of the outer diameter of the annular sealing land.

4. The valve of claim 1, wherein the outer diameter of the flow-shaping ring is 70-90 percent of the outer diameter of the annular sealing land, and the annular flow-shaping groove defines an outer diameter that is 40-60 percent of the outer diameter of the annular sealing land.

5. The valve of claim 1, wherein the outer diameter of the flow-shaping ring is about 80 percent of the outer diameter of the annular sealing land, and the annular flow-shaping groove defines an outer diameter that is about 50 percent of the outer diameter of the annular sealing land.

6. The valve of claim 1, wherein the flow-shaping ring has an axial width that is less than 25 percent of the axial width of the gallery.

7. The valve of claim 1, wherein the annular flow-shaping groove has an axial width that is at least 20 percent of the axial width of the gallery.

8. The valve of claim 1, wherein the annular flow-shaping groove has an axial width that is 20-50 percent of the axial width of the gallery.

9. The valve of claim 1, wherein the flow-shaping ring has a first side that faces axially towards the flow-shaping groove and a second side that faces axially away from the flow-shaping groove, and wherein when the gallery is fully open the second side of the flow-shaping ring defines an axial flow gap with respect to the gallery that is in the range of 40-60 percent of the axial width of the gallery.

10. The valve of claim 1, wherein the flow-shaping ring has a first side that faces axially towards the flow-shaping groove and a second side that faces axially away from the flow-shaping groove, and wherein when the gallery is fully open the second side of the flow-shaping ring defines an axial flow gap with respect to the gallery that is about 50 percent of the axial width of the gallery.

11. A spool valve comprising:
a body defining a bore comprising a first gallery and an adjacent second gallery defined by a plurality of walls; and
a positionable spool located within the bore, wherein the spool comprises:
a central body portion comprising a central body portion diameter;
sealing lands each comprising a sealing land diameter larger than the central body portion diameter, the sealing lands including first and second sealing lands that are separated by the central body portion, wherein the positionable spool is configured to be positioned such that when the sealing lands are aligned with the walls, the central body portion extends from the first gallery to the adjacent second gallery; and
a plurality of flow-shaping rings located between the first and second sealing lands, wherein the flow-shaping rings each comprise an intermediate diameter larger than the central body portion diameter and smaller than the sealing land diameter wherein when the sealing lands are aligned with the walls so as to seal the first gallery and the adjacent second gallery, a first one of the plurality of flow-shaping rings is disposed in the first gallery and a second one of the plurality of flow shaping rings is disposed in the adjacent second gallery, and wherein each flow-shaping ring has a first side that faces axially towards the central body portion and a second side that faces axially away from the central body portion, and wherein when the first gallery and the second gallery are fully open, each of the first side and the second side of each of the plurality of flow-shaping rings are spaced from an adjacent wall of the plurality of walls by a distance that is in a range of 40-60 percent of an axial width of each of the first gallery and the second gallery.

12. The spool valve of claim 11, wherein the intermediate diameter comprises about 80% of the sealing land diameter.

13. The spool valve of claim 12, wherein the central body portion diameter comprises about 50% of the sealing land diameter.

14. The spool valve of claim 11, wherein the spool further comprises a groove between one of the sealing lands and a one of the flow-shaping rings.

15. The spool valve of claim 14, wherein the groove comprises a groove width of greater than about 20% of a width of at least one of the first gallery and the adjacent second gallery.

16. A valve comprising:
a valve body defining a bore having a central axis, the valve body also defining a plurality of galleries that are axially spaced-apart from one another along the central axis, the galleries including a pump gallery positioned between a first work-port gallery and a second work-port gallery, each of the galleries including an annular cavity that surrounds the central axis and includes an open inner side in fluid communication with the bore, the valve body defining a first work port fluidly connected to the first work-port gallery, a second work port fluidly connected to the second work-port gallery, and a pump port fluidly connected to the pump gallery, the pump gallery defining an axial width; and
a spool mounted within the bore, the spool being movable within the bore along the central axis, the spool including first and second annular sealing lands that project radially outwardly from a main body of the spool, the first and second annular sealing lands being separated from one another by an annular flow passage that extends along the central axis between the valve body and the main body of the spool, the spool including first and second flow-shaping rings that project radially outwardly from the main body of the spool, the first and second flow-shaping rings being positioned within the flow passage, the first and second flow-shaping rings having outer diameters that are smaller than outer diameters of the first and second annular sealing lands, the first flow-shaping ring being separated from the first annular sealing land by a first annular flow-shaping groove, the second flow-shaping ring being separated from the second annular sealing land by a second annular flow-shaping groove, the first and second annular flow-shaping grooves having axial widths that are smaller than the axial width of the pump gallery;

the spool being axially movable within the bore between a first position and a second position, wherein in the first position: a) the annular flow passage provides fluid communication between the pump gallery and the second work-port gallery; b) the first annular sealing land blocks fluid communication between the pump gallery and the first work-port gallery; c) the first flow-shaping ring and the first flow-shaping groove are disposed within the pump gallery and substantially aligned with the pump port; and d) the second flow-shaping ring is disposed in the second work-port gallery and substantially aligned with the second work-port; and wherein in the second position: a) the annular flow passage provides fluid communication between pump gallery and the first work-port gallery; b) the second annular sealing land blocks fluid communication between the pump gallery and the second work-port gallery; c) the second flow-shaping ring and the second flow-shaping groove are disposed within the pump gallery and substantially aligned with the pump port; and d) the first flow-shaping ring is disposed in the first work-port gallery and substantially aligned with the first work-port.

17. The valve of claim 16, wherein in the first position the second flow-shaping ring and the second flow-shaping groove are axially co-extensive with the second work-port gallery, and wherein in the second position the first flow-shaping ring and the first flow-shaping groove are axially co-extensive with the first work port gallery.

18. The valve of claim 17, wherein the valve body defines first and second tank galleries, wherein the first work-port gallery, the pump gallery and the second work-port gallery are axially between the first and second tank galleries, wherein the valve body defines a tank passage outside the bore that fluidly connects the first tank gallery to the second tank gallery, wherein the valve body defines a tank port in fluid communication with the first and second tank galleries, and wherein the spool includes first and second end sealing lands positioned axially outside the first and second annular sealing lands.

19. The valve of claim 18, wherein the spool is movable to a third position where the pump port, the first work-port, and the second work-port are all in fluid communication with the tank port.

20. The valve of claim 16, wherein the outer diameters of the first and second flow-shaping rings are at most 90 percent of the outer diameters of the first and second annular sealing lands.

21. The valve of claim 16, wherein the annular flow-shaping grooves define outer diameters that are at most 60 percent of the outer diameters of the annular sealing lands.

22. The valve of claim 16, wherein the outer diameters of the flow-shaping rings are 70-90 percent of the outer diameters of the annular sealing lands, and the annular flow-shaping grooves define outer diameters that are 40-60 percent of the outer diameters of the annular sealing lands.

23. The valve of claim 16, wherein the first and second flow shaping rings have axial widths that are less than 25 percent of the axial width of the pump gallery.

24. The valve of claim 16, wherein the first and second flow-shaping grooves have axial widths that are at least 20 percent of the axial width of the pump gallery.

25. The valve of claim 16, wherein the first and second flow-shaping grooves have axial widths that are 20-60 percent of the axial width of the pump gallery.

26. The valve of claim 16, wherein the first and second flow-shaping grooves have axial widths that are 20-40 percent of the axial width of the pump gallery, and 20-40 percent of axial widths of the first and second work-port galleries.

27. The valve of claim 16, wherein the first and second flow-shaping rings have first sides that face towards their respective first and second flow-shaping grooves and second sides that face toward each other, and wherein larger transition taper is provided between the first and second flow-shaping rings and the main body of the spool at the second sides of the first and second flow-shaping rings as compared to at the first sides of the first and second flow-shaping rings.

28. The valve of claim 16, wherein the first position is a full open position in which the first annular sealing ring is fully offset from the pump gallery and the second annular sealing ring is fully offset from the second work-port gallery, and wherein the second position is a full open position in which the second annular sealing ring is fully offset from the pump gallery and the first annular sealing ring is fully offset from the first work-port gallery.

29. The valve of claim 28, wherein the first and second flow-shaping rings have first sides that face towards their respective first and second flow-shaping grooves and second sides that face toward each other, and wherein in the first and second positions, the second sides of the first and second flow-shaping rings define axial flow gaps with respect to their respective galleries that are in the range of 40-60 percent of the axial widths of their respective galleries.

* * * * *